US011509644B2

(12) United States Patent
Smith

(10) Patent No.: US 11,509,644 B2
(45) Date of Patent: Nov. 22, 2022

(54) ESTABLISHING CONNECTIONS BETWEEN IOT DEVICES USING AUTHENTICATION TOKENS

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 16/615,299

(22) PCT Filed: Jan. 10, 2018

(86) PCT No.: PCT/US2018/013149
§ 371 (c)(1),
(2) Date: Nov. 20, 2019

(87) PCT Pub. No.: WO2019/009928
PCT Pub. Date: Jan. 10, 2019

(65) Prior Publication Data
US 2020/0169549 A1 May 28, 2020

Related U.S. Application Data

(60) Provisional application No. 62/528,781, filed on Jul. 5, 2017.

(51) Int. Cl.
*H04L 9/40* (2022.01)
*G16Y 30/10* (2020.01)
*H04L 67/10* (2022.01)

(52) U.S. Cl.
CPC .......... *H04L 63/0807* (2013.01); *G16Y 30/10* (2020.01); *H04L 63/0884* (2013.01); *H04L 63/101* (2013.01); *H04L 67/10* (2013.01)

(58) Field of Classification Search
CPC ............ H04L 63/0807; H04L 63/0884; H04L 63/101; H04L 67/10; G16Y 30/10
(Continued)

(56) References Cited

U.S. PATENT DOCUMENTS 7,793,342 B1 * 9/2010 Ebrahimi ............ H04L 63/0815
726/8
8,949,978 B1 * 2/2015 Lin .......................... G06F 21/51
726/25
(Continued)

FOREIGN PATENT DOCUMENTS

WO WO-2019009928 A1 1/2019

OTHER PUBLICATIONS

Jones et al., Request for Comments (RFC) 7800, Proof-of-Possession Key Semantics for JSON Web Tokens (JWTs), Apr. 2016, Internet Engineering Task Force (IETF), https://www.rfc-editor.org/rfc/pdfrfc/rfc7800.txt.pdf (Year: 2016).*
(Continued)

*Primary Examiner* — James E Springer
(74) *Attorney, Agent, or Firm* — Schwegman Lundberg & Woessner, P.A.

(57) ABSTRACT

Various systems and methods of establishing a trusted pairing relationship between IoT devices, through the exchange of authentication service proof of possession tokens, are described herein. In an example, a trusted pairing relationship is established between IoT devices, through access control and credential resources based on communication via intermediary devices and services. The IoT devices may request or receive access to or information from a resource based on the trusted relationship.

25 Claims, 10 Drawing Sheets

(58) Field of Classification Search
USPC .......................................................... 726/9
See application file for complete search history.

(56) References Cited

U.S. PATENT DOCUMENTS

| | | | |
|---|---|---|---|
| 10,979,299 B1* | 4/2021 | Askar | H04L 41/0806 |
| 2007/0245414 A1* | 10/2007 | Chan | H04L 9/3234 |
| | | | 726/12 |
| 2015/0143471 A1 | 5/2015 | Kim et al. | |
| 2015/0215287 A1 | 7/2015 | Cottrell et al. | |
| 2015/0350168 A1 | 12/2015 | Hayton | |
| 2016/0323257 A1* | 11/2016 | Kang | H04W 12/08 |
| 2016/0381081 A1 | 12/2016 | Smith et al. | |
| 2017/0012778 A1* | 1/2017 | Choyi | H04L 63/126 |
| 2017/0111336 A1 | 4/2017 | Davis et al. | |
| 2017/0272419 A1* | 9/2017 | Kumar | H04L 63/06 |
| 2018/0278584 A1* | 9/2018 | Kuperman | H04L 9/3236 |
| 2018/0300437 A1* | 10/2018 | Thomsen | G06F 40/117 |
| 2019/0156141 A1* | 5/2019 | Moloney | G06K 9/6269 |
| 2019/0173880 A1* | 6/2019 | Nakhjiri | H04L 63/10 |
| 2021/0014001 A1* | 1/2021 | Yilmaz | H04L 45/74 |

OTHER PUBLICATIONS

"International Application Serial No. PCT/US2018/013149, International Search Report dated Apr. 30, 2018", 3 pgs.

"International Application Serial No. PCT/US2018/013149, Written Opinion dated Apr. 30, 2018", 8 pgs.

"OCF Core Specfication V1.0.0 Part 1", Open Connectivity Foundation (OCF), (Mar. 22, 2017), 175 pgs.

"OCF Security Specification V1.0.0", Open Connectivity Foundation (OCF), [Online] Retrieved from the internet: <https://openconnectivity.org/draftspecs/OCF_Securi ty_Speci fi cati on_vl.0.0.pdf>, (Mar. 22, 2017), 104 pgs.

"International Application Serial No. PCT US2018 013149, International Preliminary Report on Patentability dated Jan. 16, 2020", 10 pgs.

* cited by examiner

US 11,509,644 B2

ESTABLISHING CONNECTIONS BETWEEN IOT DEVICES USING AUTHENTICATION TOKENS

CLAIM OF PRIORITY

This application is a U.S. National Stage Application under 35 U.S.C. 371 from International Application No. PCT/US2018/013149, filed Jan. 10, 2018, published as WO 2019/009928, which claims the benefit of U.S. Provisional Patent Application Ser. No. 62/528,781, filed on Jul. 5, 2017, the benefit of priority of which is claimed hereby, and all of which are incorporated by reference herein in their entirety.

TECHNICAL FIELD

Embodiments described herein generally relate to interconnected device networks, and in particular, to techniques for establishing connections and implementing trusted relationships between internet of things (IoT) devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
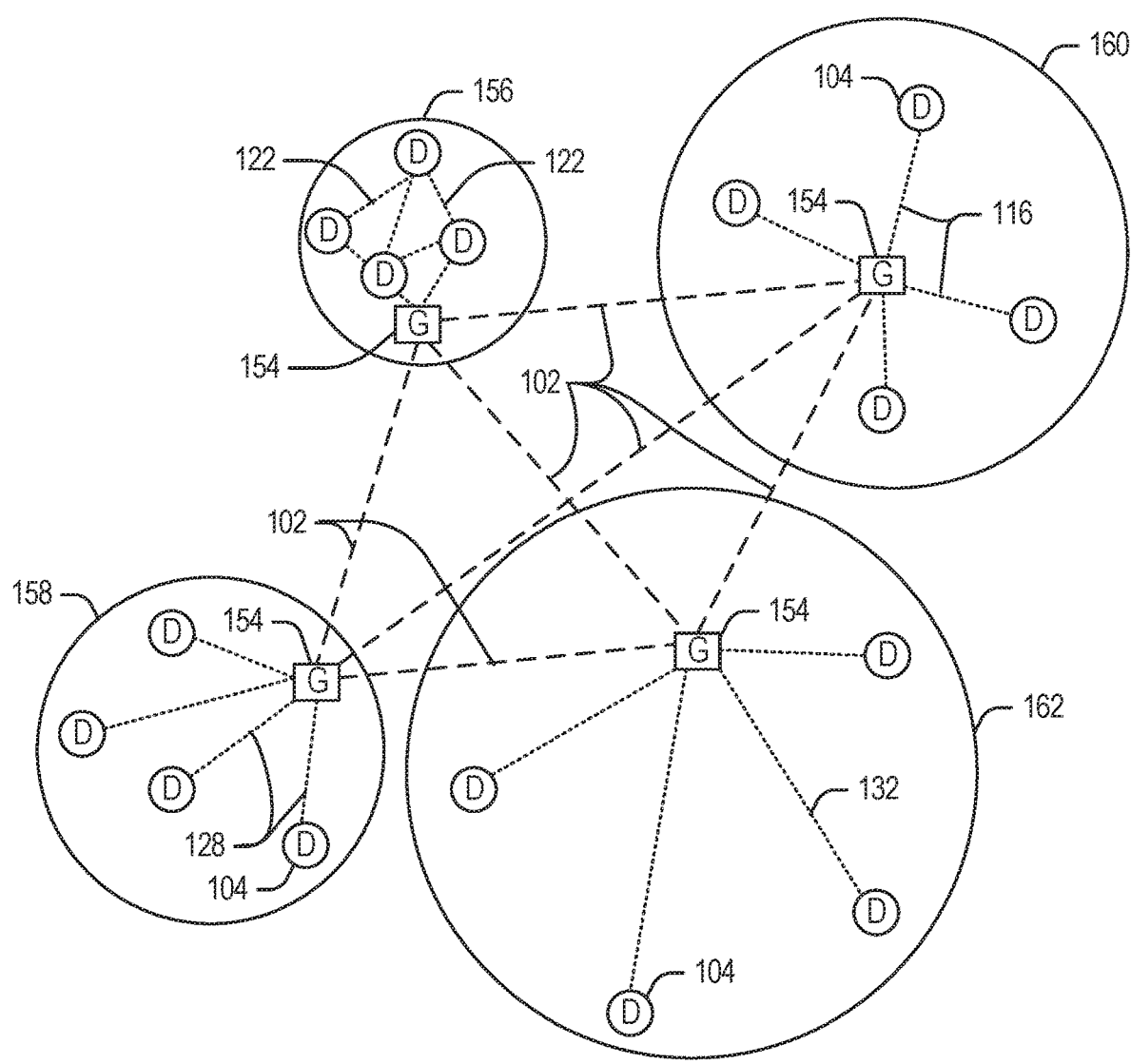
FIG. 1 illustrates an domain topology for respective internet-of-things (IoT) networks coupled through links to respective gateways, according to an example.

In the following description, methods, configurations, and related apparatuses are disclosed for establishing a trusted pairing relationship between IoT Devices through the exchange of authentication service proof of possession tokens. The integration of authorization services, such as OpenID-Connect, OAuth2, Kerberos, and the like, into IoT device networks, may provide a variety of network security and operational benefits.

In IoT network settings, intradomain interaction among devices is often defined through the use of credentials and access control (e.g., access control list (ACL)) policies that authorize appropriate credentials and interactions. The techniques discussed herein allow the integration of these credentials and policies with a cloud component that is accessed via an authentication service. The use and configuration of the presently described data model configurations may be applicable in networks and systems of devices such as in implementations of Open Connectivity Foundation (OCF) standard-based networks and devices (including in fog implementations, for a network of devices operating as a fog).

As discussed herein, a configuration for the re-use of an ACL resource and access control entry (ACE) items allows a trusted IoT device pairing relationship to tap into an existing policy, where end-to-end semantics are already defined and represented. Further, the techniques discussed herein provide for the creation of a proof of possession token, which provides a more secure approach for authentication than a bearer token that is used in conventional authentication service settings (e.g., in OAuth2/OpenID connection settings). Further, techniques discussed herein may be utilized to validate (authenticate) an end-to-end interaction in IoT networks (and IoT network domains) even without a directly connected session. Thus, security may be maintained among for device interactions in complex IoT fog and network settings.

In contrast to the techniques described herein, conventional deployments of authentication services do not provide sufficient security, confidentiality, or authorization constraints for use in IoT network settings. For instance, existing cloud services utilize single-sign on (SSO) approaches such as OAuth2 for signing into websites. For example, a user may be authenticated by signing into a common service (e.g., Google, Facebook), so when the user clicks to another website, the another website uses the service's token as the login. This is provided through implicit authorization to allow the service to provide the user's identity to the another website. However, in an IoT network setting, the IoT device involved in the use of the web token is not sophisticated enough to know what is being disclosed; or, the user that is prompted for a password will not understand the significance of what is being authorized and communicated between services without direct knowledge and permission. As a result, use of existing SSO approaches is inappropriate for most IoT networks, and especially when safety critical IoT devices are involved (such as with use of IoT devices that should not receive authorization from a naïve user to perform broad types of activities).

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often. IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
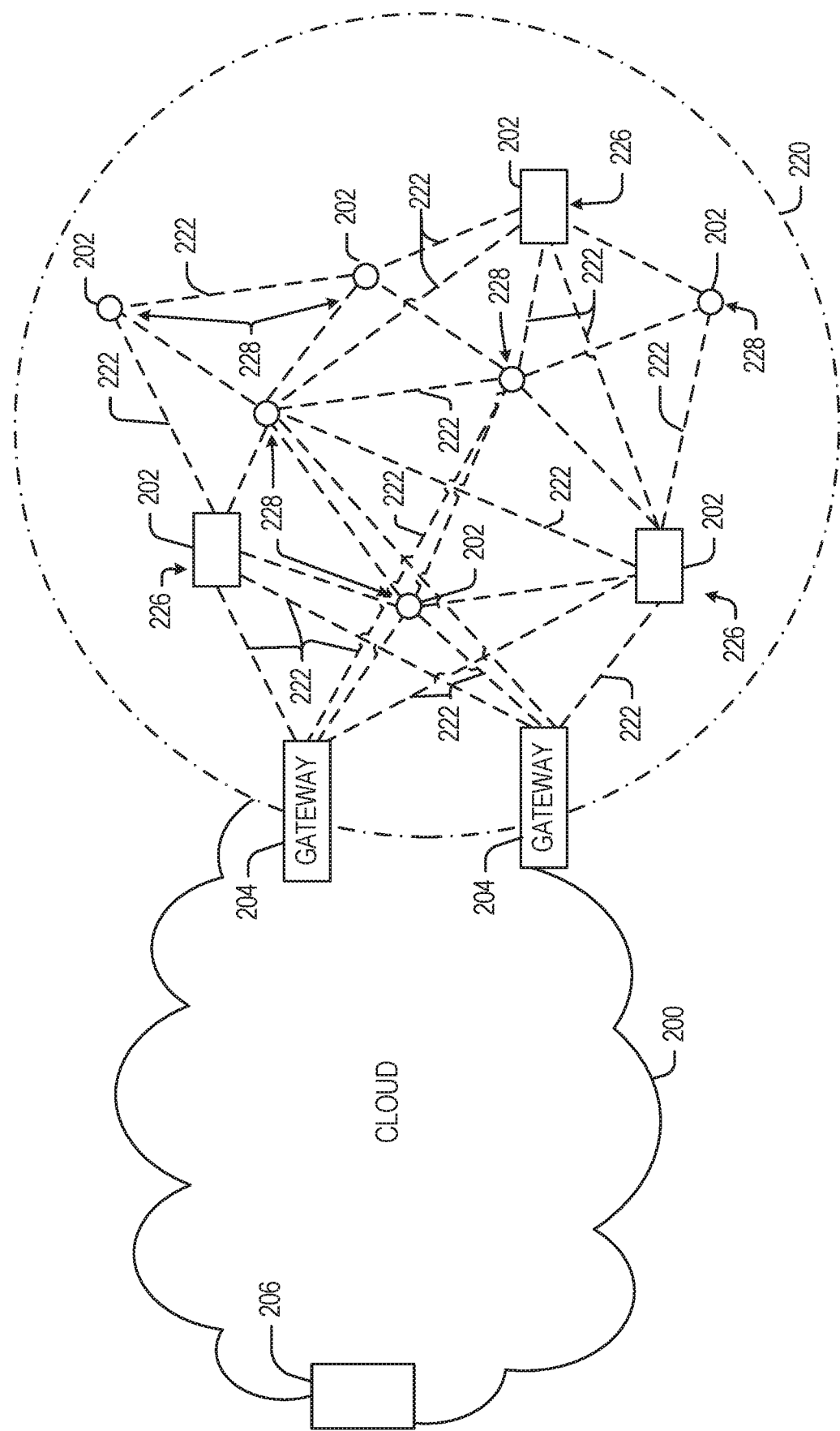
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 9 and 10.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200. e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Currently in many IoT network implementations, security is perceived based on a device-to-device model. For example, the OCF device-to-device model utilizes an ACL and ACE elements to control access to, and specific available actions within, intra-domain interactions. However, existing access control implementations do not comprehend intermediaries or inter-domain interactions, because the ACL structure in existing OCF implementations only exists in a context established between a subject (device) and resource (e.g., hosted or controlled by some other device). Existing approaches thus do not fully address the use of intermediaries such as a "cloud intermediary" (e.g., an "OCF Cloud" client).

In an OCF architecture, entities in the real physical world (e.g., a temperature sensor) are represented as resources. Interactions with entities are implemented through resource representations, which use operations that adhere to Representational State Transfer (REST) architectures, e.g., RESTful interactions. As such, entities are exposed as resources, each with their unique identifiers (URIs) and support interfaces that enable RESTful operations on their resources. A client initiates a RESTful operation on a server. The client is the initiator and the server is a responder. Any device may act as a client to initiate a RESTful operation or any other device acting as a server. Thus, the role of a device as a client or server, in many circumstances, may be interchangeable. Any device that exposes a resource is by definition, a server. Each RESTful operation contains all of the information needed to understand the context of the operation and is supported by a set of generic operations (e.g., CREATE, RETRIEVE, UPDATE, DELETE, and NOTIFY (CRUDN)).

The techniques discussed herein may be applicable to these and other network configurations. In an example, techniques are discussed for establishing a trusted pairing relationship between IoT devices (e.g., a client device and a server device respectively), and the use of this context to inform the construction of an authentication token, and specifically, proof of possession (PoP) authentication tokens. Such PoP tokens are used to establish an authentication service (e.g., OAuth2 or OpenID-Connect) "token" to be exchanged. In an example applicable to an OCF network implementation, when this authentication token is exchanged, the token may be opened by a recipient to find values that may be used to search an OCF credential resource (/cred resource) to find and verify a pre-existing trust relationship. Additionally, the token may be used to inform an access control decision, such as where an ACL resource (/acl2) may be searched to find an existing ACE entry that defines a pre-existing access policy for the client. Accordingly, this approach allows the use of existing access control specifications that are already defined for intra-domain device interactions.

Additionally, in an OCF implementation, the techniques discussed herein may utilize the OCF credential resource to establish a trusted pairing relationship between OCF devices. This context may be used to inform construction of PoP tokens by using a web token (e.g., RFC7800 JSON web tokens) to create an authentication service token. The exchange of the token may be performed using authentication service protocols (e.g., OAuth2 or OpenID-Connect). Existing OCF keys (/cred entries) may be used to protect the PoP token, and when the PoP token is exchanged, the token may be opened by its recipient to find values that may be used to search the/cred resource to find the pre-existing trust relationship. This validates (authenticates) the end-to-end interaction even though there is not a directly connected session between the client device and server device.

In an example, other authentication service protocols may be used, such as a Security Assertion Markup Language (SAML) token, an eXtensible Access Control Markup Language (XACML) token, a Kerberos token, a Fluffy token, or a signed document containing a context data item linking the signature to the authentication context. Note these token formats describe both encrypted or signed structures. In examples where encryption is described, the encryption may be applied to a signature of the PoP token. Signing may refer to symmetric key operations known as HMAC, CMAC, other Message Authentication Codes (MAC), or the like. Examples of signed document data structure include but are not limited to: JavaScript Object Signing and Encryption (JOSE), Concise Binary Object Representation (CBOR) Object Signing and Encryption (COSE), credential management service (CMS), X.509, or the like.

Thus, with the techniques discussed herein, access control in an OCF implementation may leverage an existing trust relationship that is established between an OCF client device and an OCF server device to define the context for remote access. The objective of an intermediary device such as an OCF cloud device (e.g., an OCF proxy or OCF intermediary) also may be used to determine the context so the server device knows which client device is requesting access. For example, the client device may sign or encrypt a PoP token with the client device's /cred entry for decrypting or reading at the server device. The server device may verify the PoP token, such as by finding the /cred entry corresponding to the client device. Both the client device and the server device may already have these entries provisioned in /cred as part of having been successfully managed by a credential management service (CMS).

When doing an ACE analysis, the PoP token may serve as the context that is used for ACE matching. For example, the PoP token may be used to inform an access control decision where an ACL resource (/acl2) may be searched to find an existing ACE entry that defines a pre-existing access policy for the client device. For example, the ACE entry may identify the client device and one or more resources available (e.g., provisioned, allowed access, etc.) to the client device. In an example, the access policy is setup when the client device is local to the network. This policy may be reused when the client device is remote. An existing ACL policy may be re-used where there are end-to-end semantics for authorization and permissions are already represented within the device or for a device.

Figure 3:
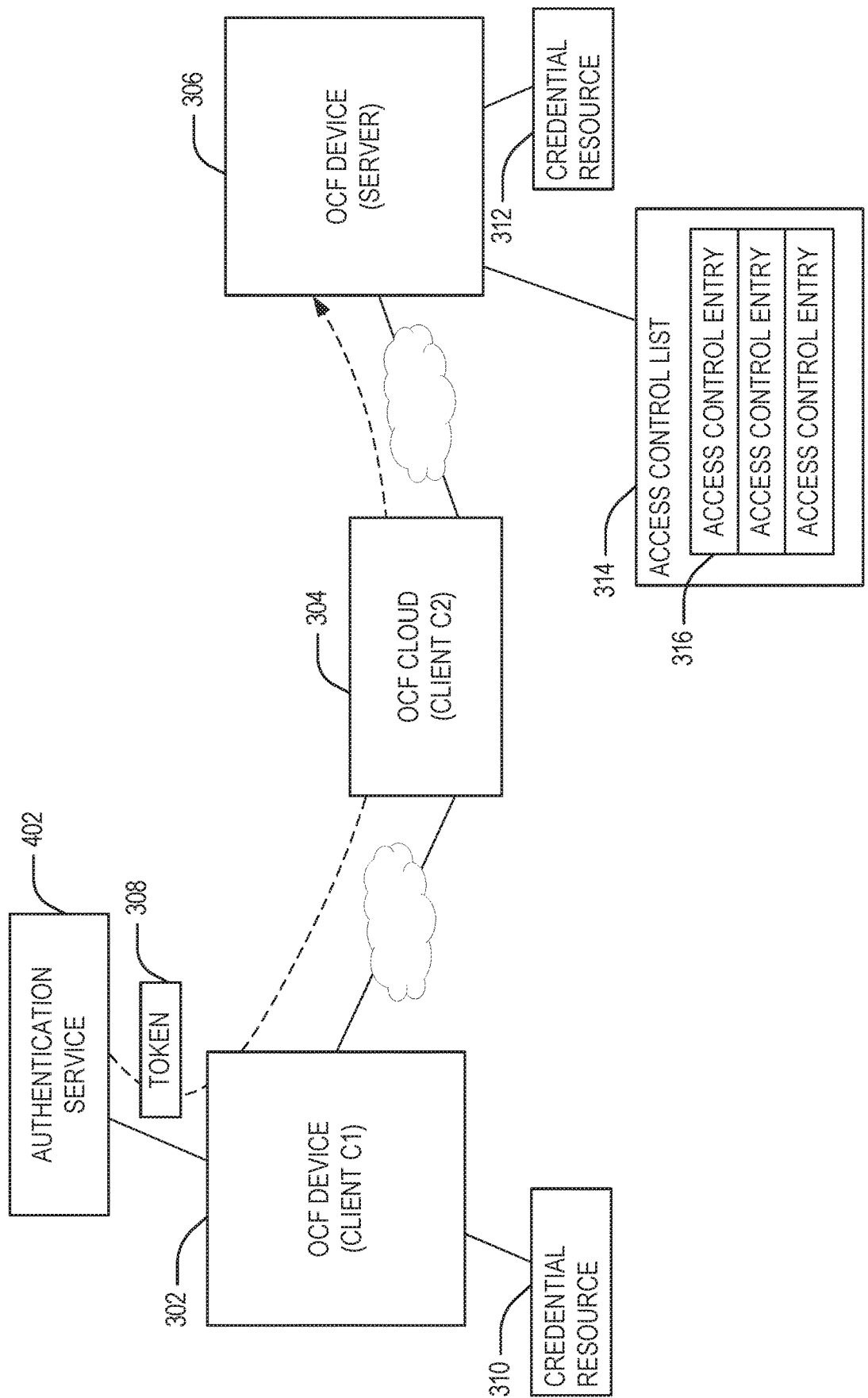
FIG. 3 illustrates a block diagram for a delivery of an authorization token from an authentication service, as communicated among IoT devices, according to an example.

FIG. 3 illustrates a block diagram of an example technique for delivery of an authorization token (e.g., proof of possession token) 308 from an authentication service, as communicated among IoT devices. As shown, in FIG. 3, an authentication service generates a token that is communicated from a first OCF device (Client C1) 302 to an OCF device (Server) 306, via an intermediary device (OCF Cloud, noted as Client C2) 304.

The generation of a token from the authorization service provides context that allows two unknown parties (Client C2 304 and Server 306) to talk with one another. One example approach usable for generating the token 308 from an authorization token may be in the form of a "bearer token." in which the token has value because any holder possesses the token and may use it. In an example, the PoP token 308 relies on the server 306 to possess the signing key. In the a bearer token example, the Authorization Service 402 may insert (e.g., assert) the PoP token 308 on behalf of the server 306. The Authorization Service 402 or the proxy server 304 may use a key specific to the Authorization Service 402 or proxy server 304 or may share a key with the server 306, such that a bearer token may be a digitally signed PoP token 308. A verification policy may be used to determine whether these alternative forms of PoP tokens 308 or bearer tokens are appropriate (e.g., being used) for a given message exchange.

In another example, a proof of possession (PoP) token 308 may be generated, which also defines the intended recipient. In an example, an IoT network specification (e.g., the OCF specification) may define the scope of the PoP token 308 so that two end points that are separated (e.g., Server 306 and Client C1 302), even in different networks, may recognize that they (and only they) may be trusted to interact with each other—even if there are many intermediaries (e.g., Client C2 304).

The communication of a PoP token 308, generated from an authentication service, in addition to use of an ACL structure 314, provides a solution to the lack of granularity that is present in many conventional uses of SSO and authentication services. For example, the ACL structure 314 may define the local interaction that is used to populate the contents of a token (e.g., standard token structure, JSON web token or other token), such that the information maintained in the token is essentially a 3-tuple or 4-tuple ACL structure 314. The token is protected by an asymmetric key found in the ACL resource 316, and thus the association between the ACL resource (ACE) 316 and credential resource (/cred) 312 is used in the context of the token. The client device C1 302 may have a credential resource 310 to allocate access to the client C1 302 to identify or allocate resources that are available or may be available to client C1 302.

In an example, the ACL structure 314 may be stored on the server 306. In another example, the ACL structure 314 may be stored on a remote server or database device. The ACL structure 314 includes one or more ACE entries, such as client ACE 316. The ACE 316 may indicate that the Client C1 302 has access to resource R1 404. In another example, ACE 316 may indicate that the server 306 is to consult with a remote ACL structure 314 to determine access rights (e.g., ping the ACL structure 314 on a remote server, and receive back access information for Client C1 302 related to resource R1 404). In an example, the ACL structure 314 may be performed using an access management service (AMS), such as one conforming to an OCF security specification.

With the proposed exchange between devices, when the token 308 arrives at a receiving device (e.g., Client C2 304 or Server 306), the receiving device may verify the token 308 based on an existing device context. The receiving device may establish whether the token 308 is valid or invalid based on credentials. In a further example, if two devices want to talk with each other, the token 308 may prompt additional user interaction to proceed with the connection. For example, a user may login and provide call back information (e.g., notify a user via phone if the device is not logged in); or a dialog box may be presented, saying there is interaction needed in the IoT network, and asking the user for approval.

Figure 4:
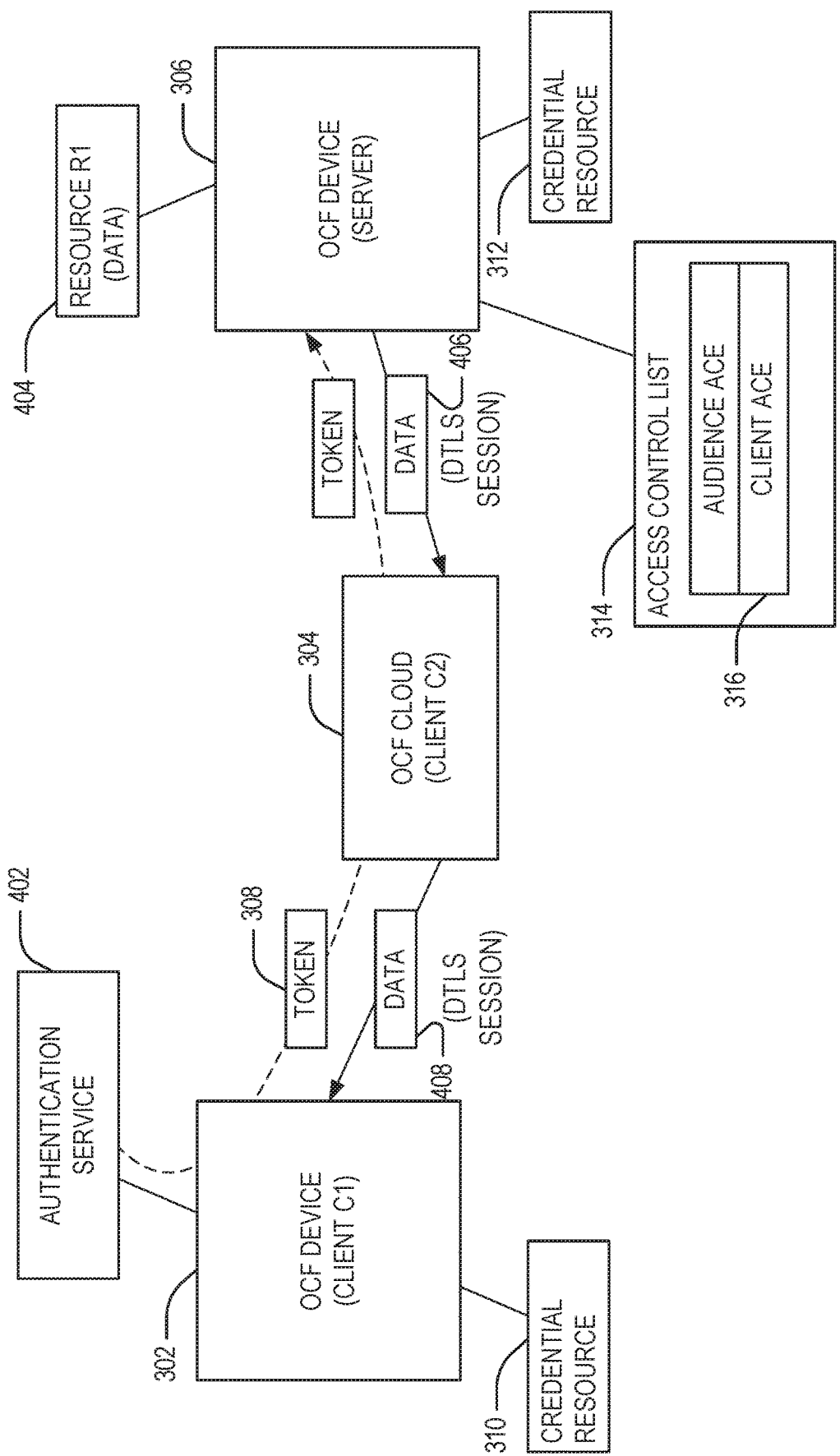
FIG. 4 illustrates a block diagram for a secure data exchange performed in response to an authorization token from an authentication service, according to an example.

FIG. 4 illustrates a block diagram of an example technique for a secure data exchange performed in response to receipt of an authorization (e.g., proof of possession) token 308 from an authentication service 402. The technique illustrated in FIG. 4 builds on the scenario depicted in FIG. 3, with the generation of an authorization token from an authentication service, with the token communicated from a first device (e.g., Client C1 302) to a second device (e.g., Server 306) via an intermediary "cloud" device (e.g., Client C2 304).

In FIG. 4, the transfer of data occurs from the Server 306 to the Client C1 302 via respective secure communication sessions with the intermediary device Client C2 304. For example, encrypted sessions (e.g., Datagram Transport Layer Security (DTLS) sessions) may be respectively established between the first device 302 and the intermediary 304, and between the second device 306 and the intermediary 304. Because the intermediary 304 has access to cleartext data shared between Client 302 and Server 306 in this scenario, it is also useful to author a restricted access policy. This may be achieved by using a second access control entry (e.g., an /acl2 ACE entry) that defines an "Audience" access. For example, if the token defines the audience to be "OCF Cloud" (e.g., the server 306), then the /acl2 ACE entry may be established to reference the OCF cloud server device 306 as the Audience. In an example, the Audience may be a distinct universally unique identification (UUID). The intermediary device 304 may identify the server 306 from the Audience and determine to send the token 308 to the server 306. In an example, the intermediary device 304 may determine that the intermediary device 304 itself is not the Audience, and therefore forward the token 308, such as without opening or reading the token 308 or without attempting to open or read the token 308. The Server 306 may know to search for the Audience ACE as well as the Client ACE, such as to determine a resource R1 404. The Server 306 also has access to a DTLS session that identifies the intermediary device 304 (the OCF Cloud) as the source of the token 308 delivery.

The Server 306 may use the token 308, the Audience, the identity of the OCF cloud device 304, the identity of the client C1 302 device, the resource R1 404, or other information to correctly apply an access policy (e.g., for client C1 302 to access the resource R1 404). For example, the following may be necessary in order for access (to the resource R1 404) to be granted (to the client C1 302): 1) the Client ACE grants Client C1 302 access to a resource R1 404 (accessed, for example, on the Server 306); 2) the Audience ACE grants the OCF Cloud 304 access to resource R1 404 (as a proxy); and 3) the Client ACE grants Client C2 (aka Cloud) 304 access to relay DTLS packets between the first DTLS session 406 and a foreign DTLS session 408 that connects to Client C1 302. The Server 306 grants access to R1 404 by granting access over the DTLS session 406 to Client C2 304 trusting that Client C2 304 will not divert packets to anyone other than C1 302, and will forward the access over the DTLS session 408 to client C1 302 to allow Client C1 302 access to the resource R1 404.

Figure 5:
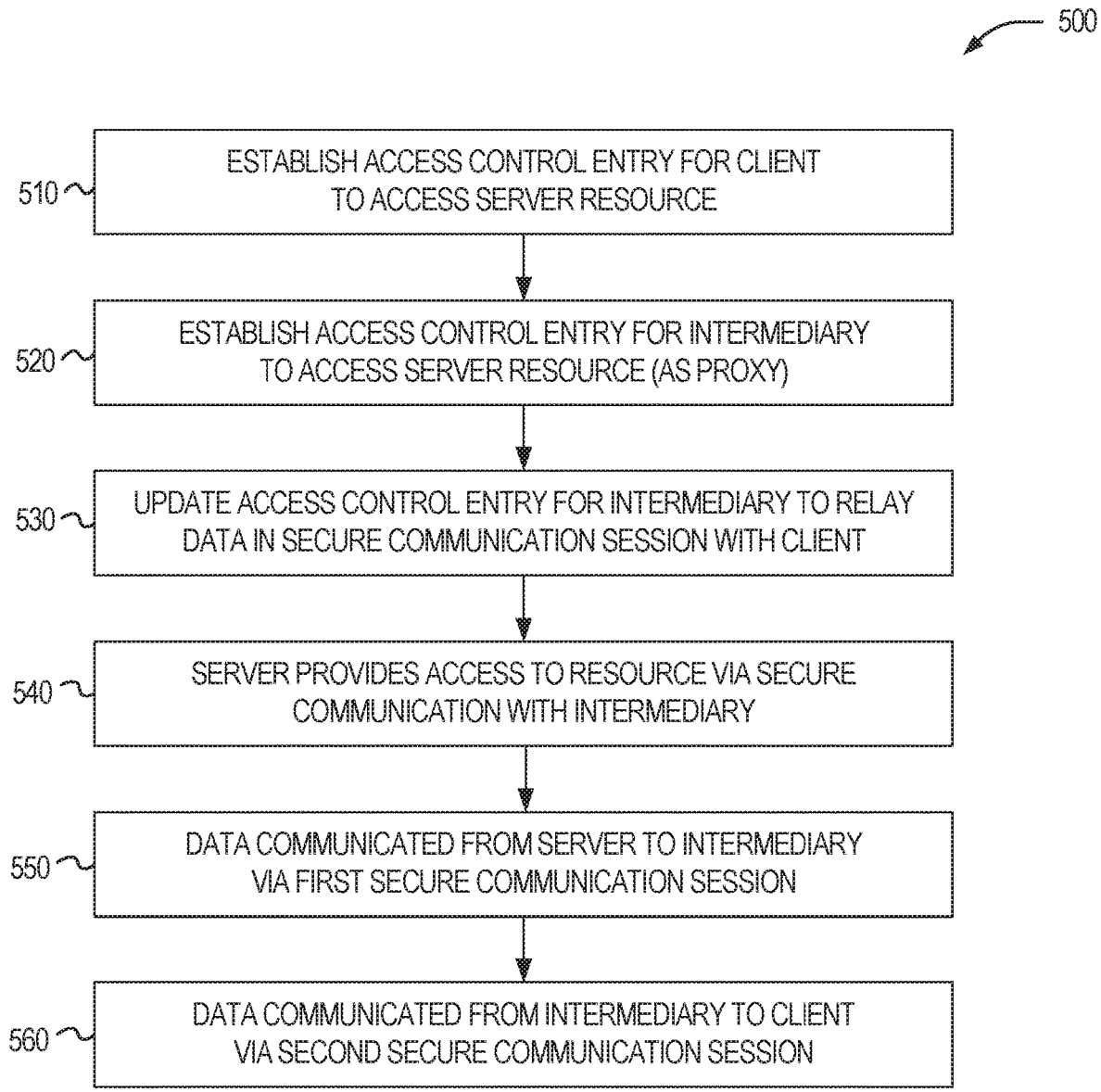
FIG. 5 illustrates a flowchart of a technique for implementing a secure data exchange utilizing access control with an intermediary, according to an example.

FIG. 5 illustrates a flowchart 500 of an example technique for implementing a secure data exchange utilizing access control with an intermediary. As shown, the operations of the flowchart 500 are depicted as sequential; in other examples, the operations of the flowchart 500 may be performed in another order or with additional (or fewer) operations. Variations to the operations may occur in scenarios involving other devices or entities on an IoT deployment network than those illustrated.

As shown, the operations of the flowchart 500 include the creation or establishment of an access control entry for a client to access a server resource (operation 510) and the establishment of an access control entry for an intermediary to the access server resource as a proxy (operation 520). As discussed herein, these access control aspects may be defined in separate client versus audience ACE entities of an access control policy available to the server. Additionally, the access control entry may be established or updated for the intermediary to relay data in secure communication session with a client (operation 530).

The operations of the flowchart 500 continue with the utilization of the access control policy. For instance, in response to a request and verification of the request in an access control list, the server provides access to a resource via secure communication with intermediary (operation 540). The data is then communicated from a server to the intermediary via a first secure communication session (operation 550), and data is then communicated from a server from the intermediary to the client via a second secure communication session (operation 560).

In further example, the resource is wrapped by a JavaScript Object Signing and Encryption (JOSE). Concise Binary Object Representation (CBOR) Object Signing and Encryption (COSE), or Object Security for Constrained RESTful Environments (OSCORE) information wrapper that prevents the intermediary from snooping the data. This provides a true end-to-end security approach that identifies the client and end point server, so that authorization is performed by true endpoints. If using security at a lower layer of the network protocol (e.g., TLS or DTLS), the assumption is that the cloud provider is trusted by both end points, and thus the cloud provider serves as a trusted man in the middle that has access to the cleartext. To avoid security concerns, the data may be encapsulated through JOSE and COSE (a secure encapsulation of data, at the higher data definition layer) and accompanying end-to-end authorization. In an example, encryption formats may include transport layer security (TLS), datagram TLS (DTLS), or Extensible Authentication Protocol (EAP) methods such as EAP_TLS or EAP_TTLS, which may be tunneled over a hop-by-hop messaging system such as HTTP and CoAP.

Figure 6:
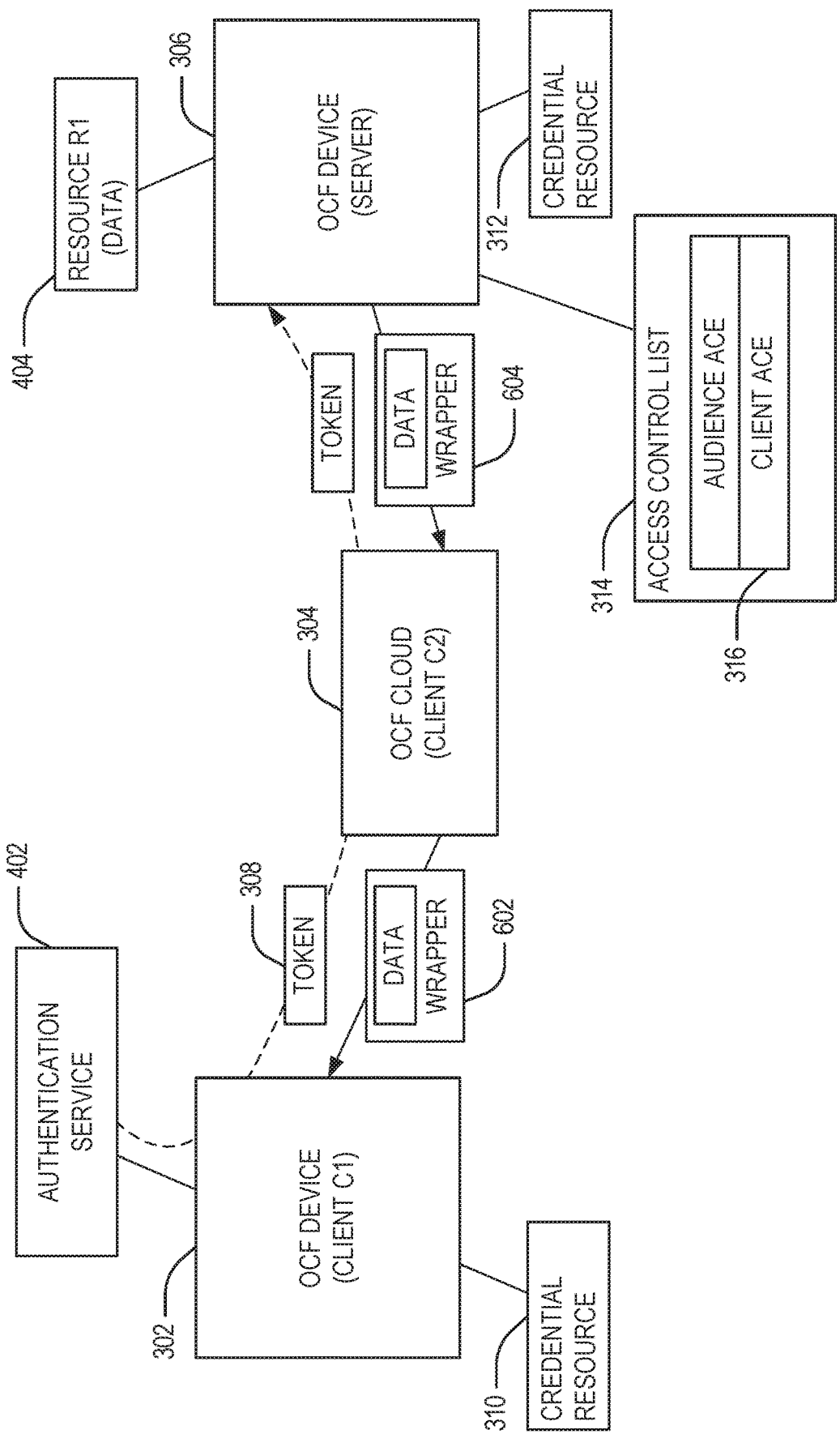
FIG. 6 illustrates a block diagram for an end-to-end encrypted data exchange performed in response to an authorization token from an authentication service, according to an example.

FIG. 6 illustrates a block diagram of an example technique for an end-to-end encrypted data exchange, performed in response to receipt of a proof of possession token from an authentication service. The technique illustrated in FIG. 6 may build on the scenario depicted in FIG. 3, with the generation of a token 308 from an authentication service. In the example shown in FIG. 6, the OCF cloud (client C2) 304 may be untrusted (whereas, in an example, the client C2 304 of FIG. 3 may be trusted). The token 308 is communicated from the first device (Client C1) 302 to the second device (Server) 306 via the intermediary "cloud" device (proxy or Client C2) 304. In this example, the data (e.g., resource R1 404 data) that is communicated from the Server 306 to the Client C1 302 is shown as being transmitted within a wrapper that provides end-to-end encryption.

In this example of end-to-end encryption (e.g., using JOSE or COSE) the access evaluation discussed above is identically the same. However, the Server 306 and Client C1 302 may use the credentials identified in the token 308 to locate /cred entries to decrypt or encrypt the data. For example, the symmetric encryption key may be an ephemeral key that is also wrapped by an asymmetric key and forwarded using the token 308.

An example sequence of a method for verifying access using the system described in FIG. 6, as implemented in an OCF network implementation, may include using a Credential Management Service (CMS) to issue credentials containing shared-symmetric keys or asymmetric keys, and the credentials may contain identity or authorization information. An Access Management Service (AMS) may provision an ACE naming Client C1 302 as the ACE Subject. An ACE subject may include a variety of matching criteria and may include role authorization certificates, authorization tokens or tickets, or the like.

The AMS and CMS provision certificates and ACE entries between the Client C2 304 and the Server 306 may be issued such that the Client C2 304 is authorized to perform the duties of an OCF Cloud. The Client C1 302 and Server 306 may register with the Cloud Client C2 304.

In an example, the Client C1 302 roams to a foreign network. The Client C1 302 may log into a web authorization provider (AP) and sign a proof of possession (PoP) token authorization content 308. This token authorization content 308 may later be used by a verifier (e.g., the server 306) to establish that Client C1 302 possesses an authentication key (e.g., one of the keys issued by the CMS), such as defined in the /oic/sec/cred resource of the server 306. The Client C1 302 requests access to Server resource R1 404 by opening a (secure) connection to Client C2 304. This includes supplying the token T1 308 and a request message M1 (which may identify the resource R1 404, and optionally the client C1 302). In another example, the token 308 may be sent without the request message M1.

The Client C2 304 verifies the Client C1 302 is a registrant. The Client C2 304 requests the authorization token from the AP on behalf of the Client C1 302. The Client C2 304 opens a (secure) connection to the Server 306. The Client C2 304 receives the token T1 308 and request message M1 originating from the Client C1 302. The Client C2 304 forwards T1 308 and M1 to the Server 306 (as the identified registered server).

The Server 306 verifies C2 304 is authorized to perform duties of a OCF Cloud (proxy or intermediary) by verifying previously provisioned credentials, which may be obtained from the server's credential resource 312 (e.g. /oic/sec/cred). The Server 306 verifies T1 contains a PoP token 308 describing a /oic/sec/cred resource that names Client C1 302 (as discussed above). If the PoP signature verifies to Client C1 302, then access is determined by matching Client C1 302 (identity or role) to an ACE entry in an /oic/sec/acl or /oic/sec/acl2 or /oic/sec/sacl or /oic/sec/amacl resource, such as by confirming the requested resource R1 404 is identified in the ACE entry as being available or accessible to the client C1 302. When the signature/token 308 is not verified or the requested resource does not match the ACE entry for the client C1 302 (e.g., if the client C1 302 is not indicated to have access to the resource R1 404), the message M1 is refused (which may or may not be indicated to the Client C2 304, which may or may not forward the refusal indication to the Client C1). The Server 306 may process the message M1 when verified.

In a further example, if M1 is an end-to-end encrypted message (e.g., encrypted with COSE or JOSE), additional steps may be performed to decrypt/verify message contents, as discussed above. Additionally, in a further example, the PoP token T1 308 may contain a key identifier that names additional key(s) used to encrypt/integrity protect the message M1. These credentials may exists in the Server's /oic/sec/cred resource already as they may have been provisioned ahead of time (e.g., as discussed above by the CMS). Additionally, the COSE or JOSE message may be encrypted using an ephemeral key such that the ephemeral key is wrapped using a key. When wrapped, the data may be sent to the Client C2 304 (e.g., in wrapper 604). The Client C2 304 may not be able to access the data within the wrapper 604, or may be able to access aspects of cleartext within the data (e.g., information identifying the Client C1 302 as the intended recipient of the data), but not other aspects of the data (e.g., resource R1 data or access). The Client C2 304 may forward the data in wrapper 602 (which may or may not be the same as wrapper 604). For example, wrapper 602 may remove information identifying Client C2 304 as a recipient from the server 306 or the forwarding identifying information for Client C1 302, since the data is on its way from the Client C2 304 to the Client C1 302.

Figure 7:
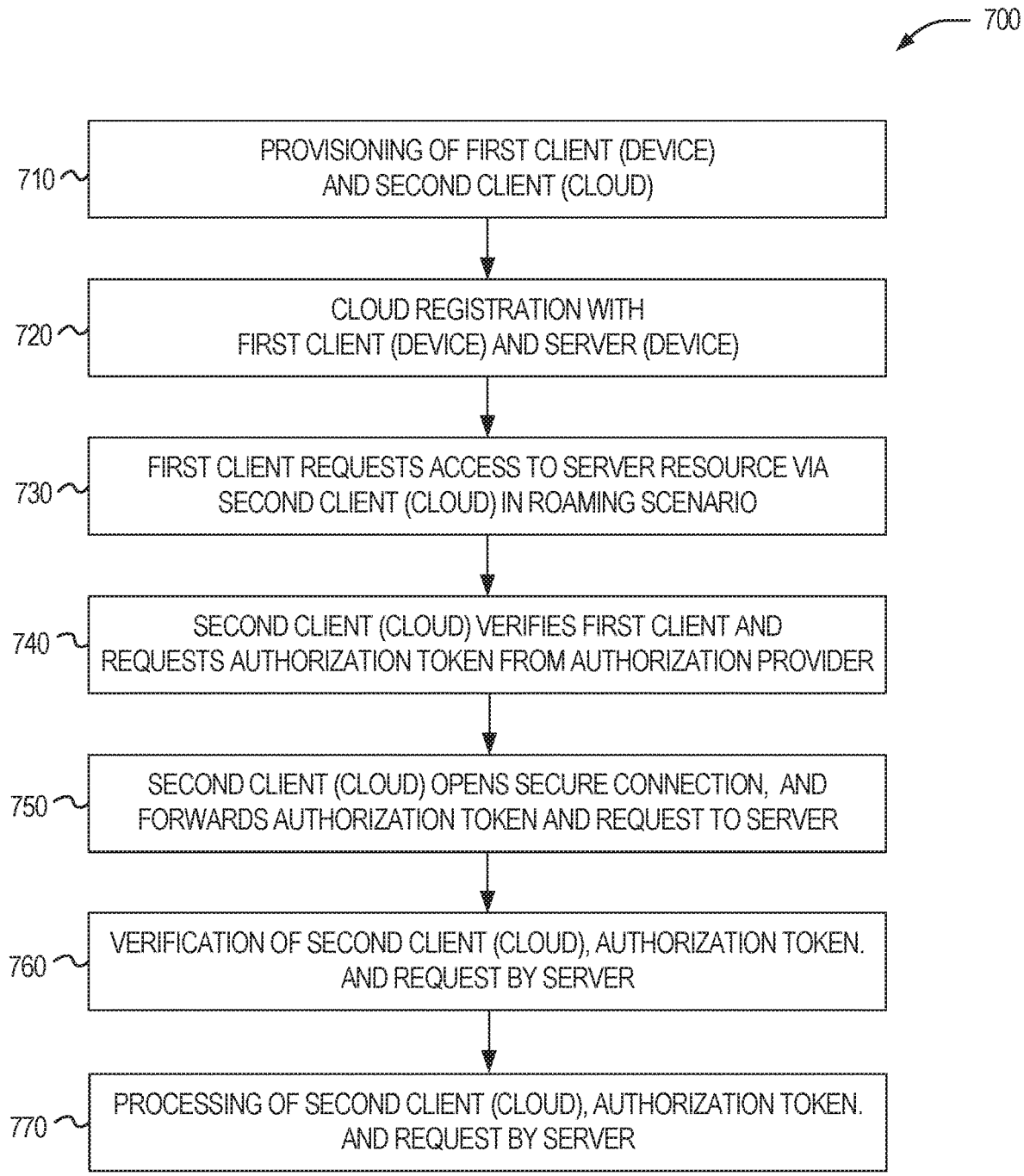
FIG. 7 illustrates a flowchart of a technique for verifying access in a secure data exchange utilizing an authorization token, according to an example.

FIG. 7 illustrates a flowchart 700 of an example technique for verifying access in a secure data exchange utilizing an authorization token. As shown, the operations of the flowchart 700 are depicted as sequential; in other examples, the operations of the flowchart 700 may be performed in another order or with additional (or fewer) operations. Variations to the operations may occur in scenarios involving other devices or entities on an IoT deployment network than those illustrated.

As shown, the operations of the flowchart 700 include the provisioning of a first client (device) and the second client (the "cloud" or other intermediary client) (operation 710) and the registration of the intermediary (the cloud) with access control mechanisms of the first client (device) and server (device) (operation 720). In an example, this may involve various provisioning and registration communications conducted with an access management service, credential management service, and like service entities.

The operations of the flowchart 700 continue with the first client requests access to server resource via second client (the cloud intermediary) in a roaming scenario (operation 730), and the second client (the cloud intermediary) verifying the first client requesting an authorization token from authorization provider (operation 740). The generation and communication of this authorization token may be performed according to the characteristics of an authorization service protocol, as suggested above.

The operations continue with the second client (the cloud intermediary) opening a secure connection, and forwarding an authorization token and request to the server (operation 750). In response to this request, verification of second client (the cloud intermediary), the authorization token, and the request may be conducted by the server (operation 760), such as with use of an access control list and credentials maintained by the server. Additional operations for processing of the request, and information to identify the second client (the cloud intermediary), and the authorization token may be undertaken by the server.

Figure 8:
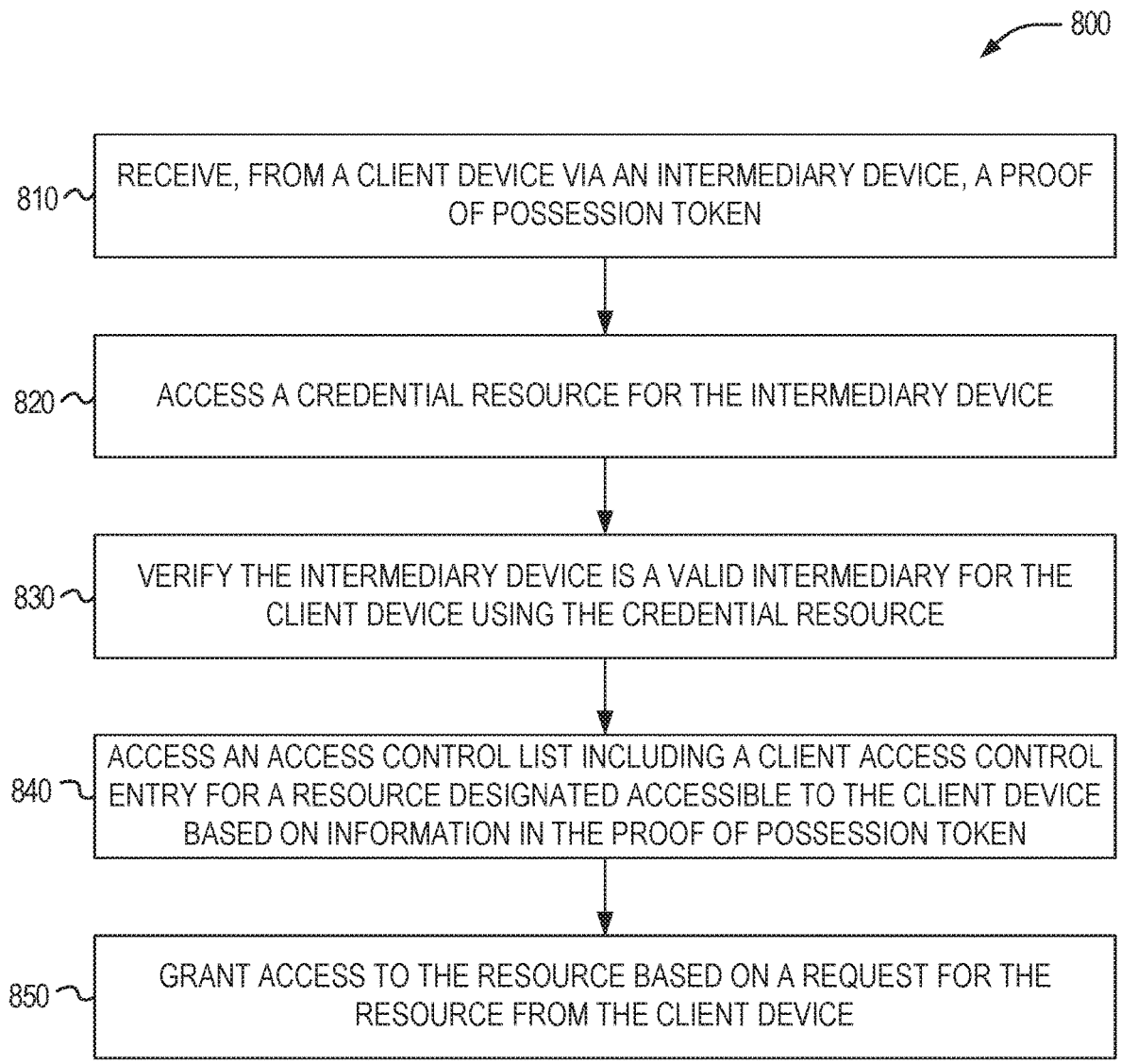
FIG. 8 is a flowchart illustrating a method for communication among IoT devices in an IoT network, according to an embodiment.

FIG. 8 illustrates a flowchart 800 of an example technique for communication among IoT devices in an IoT network. The following operations are depicted from the perspective of a server device (e.g., an OCF server) or other IoT management device or system, which manages access control policies and characteristics. However, it will be understood that the techniques of flowchart 800 may be further adapted from the perspective of a client-side device, intermediary device (which may also be called a proxy, interface, or cloud device), or systems involving client, server, and intermediate entities in combination. In an example, the flowchart 800 may be performed with communication circuitry using Representational State Transfer (RESTful) interactions among one or more Internet of Things (IoT) network topologies to perform network communication operations, and the network communications may be conducted according to one or more Open Connectivity Foundation (OCF) specifications.

The flowchart 800 begins with an operation 810 to receive, from a client device via an intermediary device, a proof of possession token (e.g., using OAuth2, Open ID connect, etc.), for example at or via communication circuitry of a server device. In an example, the proof of possession token may be a bearer token. The server device may be an open connectivity foundation (OCF) server device and the client device is an OCF client device, and further comprising registering the intermediary device as an OCF cloud device or OCF proxy device prior to receiving the proof of possession token.

The flowchart 800 continues with an operation 820 to access a credential resource for the intermediary device. Operation 820 may include searching the access control list for the client device or a resource.

The flowchart 800 continues with an operation 830 to verify the intermediary device is a valid intermediary for the client device using the credential resource. In an example, verifying the proof of possession token includes verifying that the proof of possession token was signed by the client device using an authentication key. In an example, the client device communicates with the intermediary device using a different network protocol than a network protocol used to communicate between the server device and the intermediary device. The client device or the server device may be registered with the intermediary device using an access management service and a credential management service.

The flowchart 800 continues with an operation 840 to access an access control list, the access control list including a client access control entry for a resource designated accessible to the client device based on information in the proof of possession token. The proof of possession token may identify the server device or the client device. The flowchart 800 continues with an operation 850 to granting access to the resource based on a request for the resource from the client device.

In an example, the proof of possession token is end to end encrypted from the client device to the server device, preventing the intermediary device from accessing the proof of possession token. For example, the proof of possession token may be end to end encrypted using JOSE, COSE. OSCORE, or the like. In an example, the proof of possession token generated by the authentication service is wrapped by a second proof of possession token generated by the client device for verification with the intermediary device, and further comprising verifying validity of the second proof of possession token to determine that the intermediary device is an intended proxy of the client device.

In an example, the intermediary device may be trusted. In this example, the proof of possession token identifies the server device as an intended audience, wherein in response to identifying the server device as the intended audience, forwarding, from the intermediary device, the proof of possession token to the server device. The technique may include an operation to receive a message from the client device via the intermediary device with the proof of possession token, the message identifying the resource. The technique may include determining that the access control list identifies the resource as being available to the client device in response to processing the message.

In an example, the operations and functionality described above with reference to FIGS. 3 to 8 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 9:
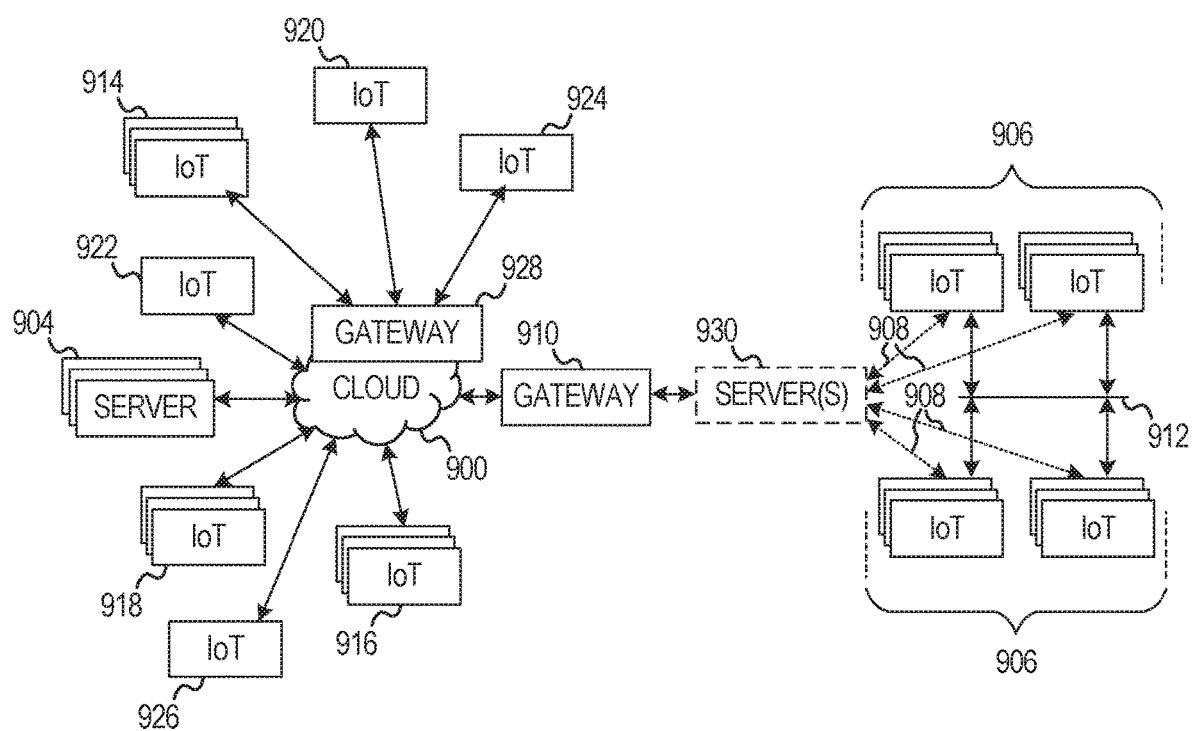
FIG. 9 illustrates a block diagram of a network illustrating communications among a number of IoT devices, according to an example.

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 2), or a combination therein. The groups of IoT devices may be deployed in various residential, commercial, and industrial settings (including in both private or public environments).

As may be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 2).

Figure 10:
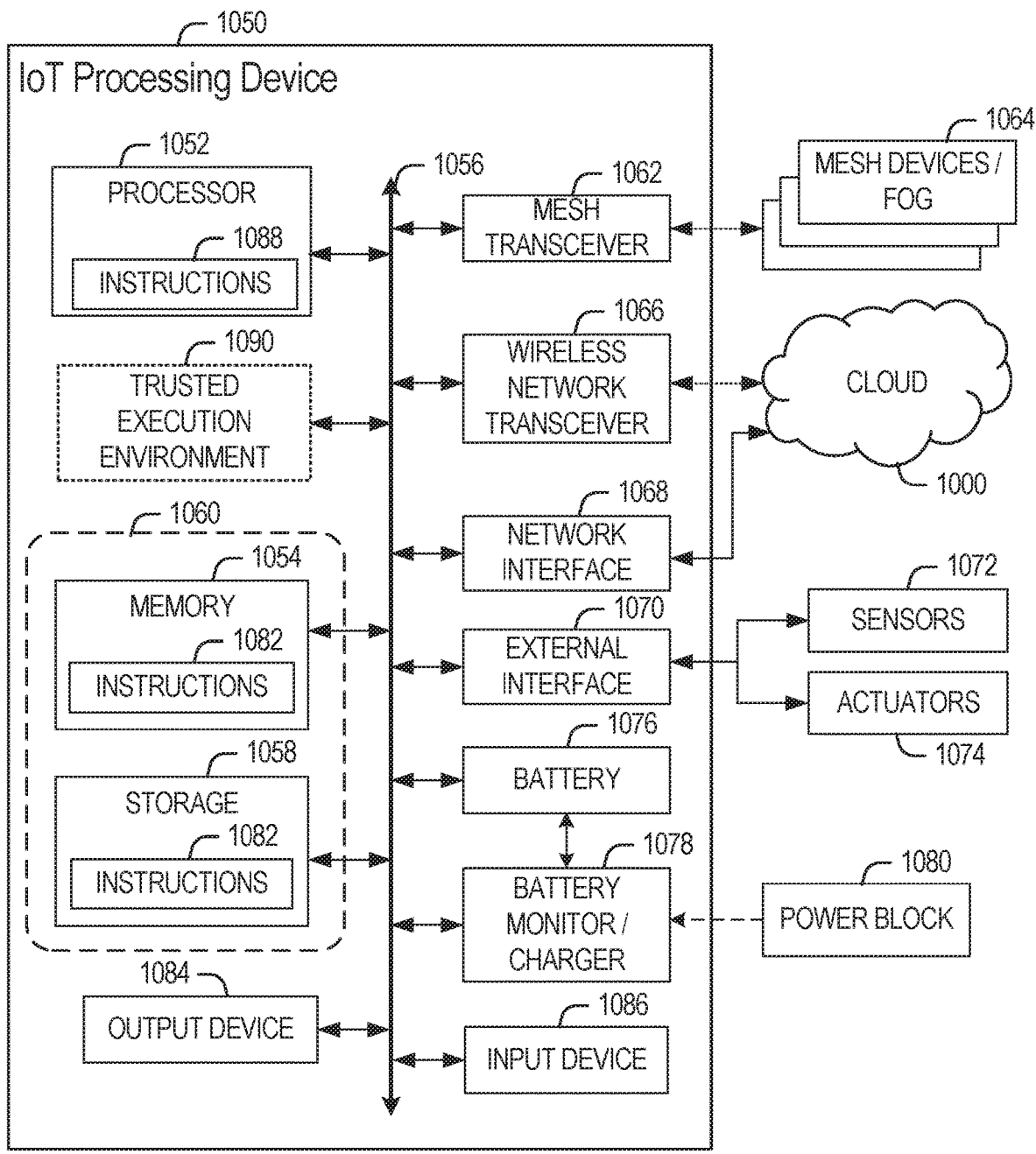
FIG. 10 illustrates a block diagram for an example IoT processing system architecture upon which any one or more of the techniques (e.g., operations, processes, methods, and methodologies) discussed herein may be performed, according to an example.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif. an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies. Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx). PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064. e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN). Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram (s) of operations and functionality depicted above.

In still a specific example, the instructions 1088 on the processor 1052 (separately, or in combination with the instructions 1088 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052. In an example, a PoP token (e.g., PoP token 308 above) may be created or verified within the TEE 1090. Access control decisions enforced by a proxy/intermediary device (e.g., 304) or endpoint device (e.g., 306) may be implemented in the TEE 1090.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Example 1 is a server device, comprising: processing circuitry; and communication circuitry to receive, from a client device via an intermediary device, a proof of possession token generated by an authentication service on behalf of the client device; a memory device including instructions embodied thereon, wherein the instructions, when executed by the processing circuitry, configure the processing circuitry to perform operations to: access a credential resource for the intermediary device; verify the intermediary device is a valid intermediary for the client device using the credential resource; access an access control list, the access control list including a client access control entry for a resource designated accessible to the client device, based on information in the proof of possession token; and grant access to the resource based on a request for the resource from the client device.

In Example 2, the subject matter of Example 1 includes, wherein the proof of possession token is end to end encrypted from the client device to the server device, preventing the intermediary device from accessing data of the proof of possession token.

In Example 3, the subject matter of Example 2 includes, wherein the proof of possession token is end to end encrypted using a JavaScript Object Signing and Encryption (JOSE), Concise Binary Object Representation (CBOR) Object Signing and Encryption (COSE), or Object Security for Constrained RESTful Environments (OSCORE) encryption technique.

In Example 4, the subject matter of Examples 1-3 includes, wherein the intermediary device is trusted by the server device, and wherein the proof of possession token identifies the server device as an intended audience, wherein in response to identifying the server device as the intended audience, the intermediary device is caused to forward the proof of possession token to the server device.

In Example 5, the subject matter of Examples 1-4 includes, wherein the proof of possession token generated by the authentication service is wrapped by a second proof of possession token generated by the client device for verification with the intermediary device, and wherein the server device is further to verify validity of the second proof of possession token to determine that the intermediary device is an authorized proxy of the client device.

In Example 6, the subject matter of Examples 1-5 includes, wherein the proof of possession token identifies the server device and the client device.

In Example 7, the subject matter of Example 6 includes, wherein the proof of possession token is one of an OAuth2, OpenID connect, SAML, XACML, Kerberos, or Fluffy token.

In Example 8, the subject matter of Examples 6-7 includes, wherein the proof of possession token is a bearer token.

In Example 9, the subject matter of Examples 1-8 includes, wherein the server device is an open connectivity foundation (OCF) server device and the client device is an OCF client device, and wherein the OCF server device is further to register the intermediary device as an OCF cloud device or OCF proxy device prior to receiving the proof of possession token.

In Example 10, the subject matter of Examples 1-9 includes, wherein the client device communicates with the intermediary device using a different network protocol than a network protocol used to communicate between the server device and the intermediary device.

In Example 11, the subject matter of Examples 1-10 includes, wherein the client device and the server device are registered with the intermediary device using an access management service and a credential management service.

In Example 12, the subject matter of Examples 1-11 includes, wherein to verify the proof of possession token, the processing circuitry is to verify that the proof of possession token was signed by the client device using an authentication key.

In Example 13, the subject matter of Examples 1-12 includes, wherein to access the access control list, the processing circuitry is to search the access control list for the client device.

In Example 14, the subject matter of Examples 1-13 includes, wherein the instructions further configure: the communication circuitry to perform an operation to receive a message from the client device via the intermediary device with the proof of possession token, the message identifying the resource; and the processing circuitry to determine that the access control list identifies the resource as being available to the client device in response to processing the message.

In Example 15, the subject matter of Examples 1-14 includes, wherein the communication circuitry is to use Representational State Transfer (RESTful) interactions among one or more Internet of Things (IoT) network topologies to perform network communication operations, and wherein the network communication operations are conducted according to one or more Open Connectivity Foundation (OCF) specifications.

Example 16 is a method, comprising a plurality of operations executed with a processor and memory of a device, the operations comprising: receiving, via communication circuitry, from a client device via an intermediary device, a proof of possession token generated by an authentication service on behalf of the client device; accessing a credential resource for the intermediary device; verifying the intermediary device is a valid intermediary for the client device using the credential resource; accessing an access control list, the access control list including a client access control entry for a resource designated accessible to the client device, based on information in the proof of possession token; and granting access to the resource based on a request for the resource from the client device.

In Example 17, the subject matter of Example 16 includes, wherein the proof of possession token is end to end encrypted from the client device to the server device, preventing the intermediary device from accessing data of the proof of possession token.

In Example 18, the subject matter of Example 17 includes, wherein the proof of possession token is end to end encrypted using a JavaScript Object Signing and Encryption (JOSE), Concise Binary Object Representation (CBOR) Object Signing and Encryption (COSE), or Object Security for Constrained RESTful Environments (OSCORE) encryption technique.

In Example 19, the subject matter of Examples 16-18 includes, wherein the intermediary device is trusted by the server device, and wherein the proof of possession token identifies the server device as an intended audience, wherein in response to identifying the server device as the intended audience, forwarding, from the intermediary device, the proof of possession token to the server device.

In Example 20, the subject matter of Examples 16-19 includes, wherein the proof of possession token generated by the authentication service is wrapped by a second proof of possession token generated by the client device for verification with the intermediary device, and further comprising verifying validity of the second proof of possession token to determine that the intermediary device is an authorized proxy of the client device.

In Example 21, the subject matter of Examples 16-20 includes, wherein the proof of possession token identifies the server device and the client device.

In Example 22, the subject matter of Example 21 includes, wherein the proof of possession token is one of an OAuth2, OpenID connect, SAML, XACML. Kerberos, or Fluffy token.

In Example 23, the subject matter of Examples 21-22 includes, wherein the proof of possession token is a bearer token.

In Example 24, the subject matter of Examples 16-23 includes, wherein the server device is an open connectivity foundation (OCF) server device and the client device is an OCF client device, and further comprising registering the intermediary device as an OCF cloud device or OCF proxy device prior to receiving the proof of possession token.

In Example 25, the subject matter of Examples 16-24 includes, wherein the client device communicates with the intermediary device using a different network protocol than a network protocol used to communicate between the server device and the intermediary device.

In Example 26, the subject matter of Examples 16-25 includes, wherein the client device and the server device are registered with the intermediary device using an access management service and a credential management service.

In Example 27, the subject matter of Examples 16-26 includes, wherein verifying the proof of possession token includes verifying that the proof of possession token was signed by the client device using an authentication key.

In Example 28, the subject matter of Examples 16-27 includes, wherein accessing the access control list includes searching the access control list for the client device.

In Example 29, the subject matter of Examples 16-28 includes, performing an operation to receive a message from the client device via the intermediary device with the proof of possession token, the message identifying the resource; and determining that the access control list identifies the resource as being available to the client device in response to processing the message.

In Example 30, the subject matter of Examples 16-29 includes, wherein the communication circuitry is to use Representational State Transfer (RESTful) interactions among one or more Internet of Things (IoT) network topologies to perform network communication operations, and wherein the network communication operations are conducted according to one or more Open Connectivity Foundation (OCF) specifications.

Example 31 is at least one machine-readable medium including instructions for operation of a computing system, which when executed by a machine, cause the machine to perform operations of any of the methods of Examples 16-30.

Example 32 is an apparatus comprising means for performing any of the methods of Examples 16-30.

Example 33 is a device-readable storage medium including instructions, wherein the instructions, when executed by a processing circuitry of a server device, cause the processing circuitry to: receive, via communication circuitry, from a client device via an intermediary device, a proof of possession token generated by an authentication service on behalf of the client device; access a credential resource for the intermediary device; verify the intermediary device is a valid intermediary for the client device using the credential resource; access an access control list, the access control list including a client access control entry for a resource designated accessible to the client device, based on information in the proof of possession token; and grant access to the resource based on a request for the resource from the client device.

In Example 34, the subject matter of Example 33 includes, wherein the proof of possession token is end to end encrypted from the client device to the server device, preventing the intermediary device from accessing data of the proof of possession token.

In Example 35, the subject matter of Example 34 includes, wherein the proof of possession token is end to end encrypted using a JavaScript Object Signing and Encryption (JOSE), Concise Binary Object Representation (CBOR) Object Signing and Encryption (COSE), or Object Security for Constrained RESTful Environments (OSCORE) encryption technique.

In Example 36, the subject matter of Examples 33-35 includes, wherein the intermediary device is trusted by the server device, and wherein the proof of possession token identifies the server device as an intended audience, wherein in response to identifying the server device as the intended audience, forwarding, from the intermediary device, the proof of possession token to the server device.

In Example 37, the subject matter of Examples 33-36 includes, wherein the proof of possession token generated by the authentication service is wrapped by a second proof of possession token generated by the client device for verification with the intermediary device, and wherein the instructions further cause the processing circuitry to verify validity of the second proof of possession token to determine that the intermediary device is an authorized proxy of the client device.

In Example 38, the subject matter of Examples 33-37 includes, wherein the proof of possession token identifies the server device and the client device.

In Example 39, the subject matter of Example 38 includes, wherein the proof of possession token is one of an OAuth2, OpenID connect, SAML, XACML, Kerberos, or Fluffy token.

In Example 40, the subject matter of Examples 38-39 includes, wherein the proof of possession token is a bearer token.

In Example 41, the subject matter of Examples 33-40 includes, wherein the server device is an open connectivity foundation (OCF) server device and the client device is an OCF client device, and wherein the instructions further cause the processing circuitry to register the intermediary device as an OCF cloud device or OCF proxy device prior to receiving the proof of possession token.

In Example 42, the subject matter of Examples 33-41 includes, wherein the client device communicates with the intermediary device using a different network protocol than a network protocol used to communicate between the server device and the intermediary device.

In Example 43, the subject matter of Examples 33-42 includes, wherein the client device and the server device are registered with the intermediary device using an access management service and a credential management service.

In Example 44, the subject matter of Examples 33-43 includes, wherein to verify the proof of possession token, the instructions further cause the processing circuitry to verify that the proof of possession token was signed by the client device using an authentication key.

In Example 45, the subject matter of Examples 33-44 includes, wherein to access the access control list, the instructions further cause the processing circuitry to search the access control list for the client device.

In Example 46, the subject matter of Examples 33-45 includes, wherein the instructions further cause the processing circuitry to: perform an operation to receive a message from the client device via the intermediary device with the proof of possession token, the message identifying the resource; and determine that the access control list identifies the resource as being available to the client device in response to processing the message.

In Example 47, the subject matter of Examples 33-46 includes, wherein the communication circuitry is to use Representational State Transfer (RESTful) interactions among one or more Internet of Things (IoT) network topologies to perform network communication operations, and wherein the network communication operations are conducted according to one or more Open Connectivity Foundation (OCF) specifications.

Example 48 is an apparatus comprising: means for receiving, via communication circuitry of a server device, from a client device via an intermediary device, a proof of possession token generated by an authentication service on behalf of the client device; means for accessing a credential resource for the intermediary device; means for verifying the intermediary device is a valid intermediary for the client device using the credential resource; means for accessing an access control list, the access control list including a client access control entry for a resource designated accessible to the client device based on information in the proof of possession token; and means for granting access to the resource based on a request for the resource from the client device.

In Example 49, the subject matter of Example 48 includes, wherein the proof of possession token is end to end encrypted from the client device to the server device, preventing the intermediary device from accessing data of the proof of possession token.

In Example 50, the subject matter of Example 49 includes, wherein the proof of possession token is end to end encrypted using a JavaScript Object Signing and Encryption (JOSE). Concise Binary Object Representation (CBOR) Object Signing and Encryption (COSE), or Object Security for Constrained RESTful Environments (OSCORE) encryption technique.

In Example 51, the subject matter of Examples 48-50 includes, wherein the intermediary device is trusted by the server device, and wherein the proof of possession token identifies the server device as an intended audience, wherein in response to identifying the server device as the intended audience, means for forwarding, from the intermediary device, the proof of possession token to the server device.

In Example 52, the subject matter of Examples 48-51 includes, wherein the proof of possession token generated by the authentication service is wrapped by a second proof of possession token generated by the client device for verification with the intermediary device, and further comprising means for verifying validity of the second proof of possession token to determine that the intermediary device is an authorized proxy of the client device.

In Example 53, the subject matter of Examples 48-52 includes, wherein the proof of possession token identifies the server device and the client device.

In Example 54, the subject matter of Example 53 includes, wherein the proof of possession token is one of an OAuth2. OpenID connect, SAML, XACML, Kerberos, or Fluffy token.

In Example 55, the subject matter of Examples 53-54 includes, wherein the proof of possession token is a bearer token.

In Example 56, the subject matter of Examples 48-55 includes, wherein the server device is an open connectivity foundation (OCF) server device and the client device is an OCF client device, and further comprising means for registering the intermediary device as an OCF cloud device or OCF proxy device prior to receiving the proof of possession token.

In Example 57, the subject matter of Examples 48-56 includes, wherein the client device communicates with the intermediary device using a different network protocol than a network protocol used to communicate between the server device and the intermediary device.

In Example 58, the subject matter of Examples 48-57 includes, wherein the client device and the server device are registered with the intermediary device using an access management service and a credential management service.

In Example 59, the subject matter of Examples 48-58 includes, wherein the means for verifying the proof of possession token include means for verifying that the proof of possession token was signed by the client device using an authentication key.

In Example 60, the subject matter of Examples 48-59 includes, wherein accessing the access control list includes means for searching the access control list for the client device.

In Example 61, the subject matter of Examples 48-60 includes, means for performing an operation to receive a message from the client device via the intermediary device with the proof of possession token, the message identifying the resource; and means for determining that the access control list identifies the resource as being available to the client device in response to processing the message.

In Example 62, the subject matter of Examples 48-61 includes, wherein the communication circuitry is to use Representational State Transfer (RESTful) interactions among one or more Internet of Things (IoT) network topologies to perform network communication operations, and wherein the network communication operations are conducted according to one or more Open Connectivity Foundation (OCF) specifications.

Example 63 is a system, comprising: a server device including: processing circuitry; and communication circuitry to receive, from a client device via an intermediary device, a proof of possession token generated by an authentication service on behalf of the client device; a memory device including instructions embodied thereon, wherein the instructions, when executed by the processing circuitry, configure the processing circuitry to perform operations to: access a credential resource for the intermediary device; verify the intermediary device is a valid intermediary for the client device using the credential resource; access an access control list, the access control list including a client access control entry for a resource designated accessible to the client device, based on information in the proof of possession token; and grant access to the resource based on a request for the resource from the client device.

In Example 64, the subject matter of Example 63 includes, wherein the system further comprises the intermediary device to: receive the proof of possession token from the client device; identify the server device as an intended audience from information in the proof of possession token; identify, in an audience access control entry, an identifier of the server device; and forward the proof of possession token to the server device using the identifier.

In Example 65, the subject matter of Example 64 includes, wherein the intermediary device is a cloud device or proxy device registered to interact with the server device using Representational State Transfer (RESTful) interactions among one or more Internet of Things (IoT) network topologies, and wherein the interactions are conducted according to one or more Open Connectivity Foundation (OCF) specifications.

In Example 66, the subject matter of Examples 63-65 includes, wherein the system further comprises the client device to: generate the proof of possession token and a message requesting the resource; send the proof of possession token and the message to the intermediary device; and receive, from the server device via the intermediary device, the information from the resource.

In Example 67, the subject matter of Example 66 includes, wherein the client device is further to access a web authorization provider to sign the proof of possession token, the proof of possession token signed by the client device using a key received from a credential management service.

Example 68 is a device fog adapted to perform the operations of any of Examples 1 to 67.

Example 69 is a cloud service server adapted to perform the operations of a cloud service invoked by any of Examples 1 to 67.

Example 70 is an edge computing device adapted to perform the operations of a client device invoked by any of Examples 1 to 67.

Example 71 is a credential management service server adapted to perform the operations of credentialing invoked by any of Examples 1 to 67.

Example 72 is an authentication management service server adapted to perform the operations of authentication invoked by any of Examples 1 to 67.

Example 73 is a device onboarding service server adapted to perform the operations of onboarding invoked by any of Examples 1 to 67.

Example 74 is an Open Connectivity Foundation (OCF) device, configured as a server, client, or intermediary according to an OCF specification, comprising means to implement the operations of any of Examples 1 to 67.

Example 75 is an Internet of Things (IoT) network topology, the IoT network topology comprising respective communication links adapted to perform communications for the operations of any of Examples 1 to 67.

Example 76 is a network comprising respective devices and device communication mediums for performing any of the operations of Examples 1 to 67.

Example 77 is an apparatus comprising means for performing any of the operations of Examples 1 to 67.

Example 78 is a system to perform the operations of any of Examples 1 to 67.

Example 79 is a method to perform the operations of any of Examples 1 to 67.

Example 80 is at least one machine-readable medium including instructions that, when executed by processing circuitry, cause the processing circuitry to perform operations to implement of any of Examples 1-79.

Example 81 is an apparatus comprising means to implement of any of Examples 1-79.

Example 82 is a system to implement of any of Examples 1-79.

Example 83 is a method to implement of any of Examples 1-79.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A server device, comprising:
   processing circuitry; and
   communication circuitry to receive a proof of possession token forwarded from a client device by an intermediary device, the proof of possession token generated by an authentication service on behalf of the client device;
   a memory device including instructions embodied thereon, wherein the instructions, when executed by the processing circuitry, configure the processing circuitry to perform operations to:
   access, at the server device, a credential resource for the intermediary device;
   verify, at the server device, that the client device has indicated that the intermediary device is authorized to act as a valid intermediary for the client device using the credential resource;
   access an access control list including a client access control entry for a resource designated accessible to the client device, based on information in the proof of possession token; and
   grant, to the client device, access to the resource based on a request for the resource from the client device.

2. The server device of claim 1, wherein the proof of possession token is end to end encrypted from the client device to the server device, preventing the intermediary device from accessing data of the proof of possession token.

3. The server device of claim 2, wherein the proof of possession token is end to end encrypted using a JavaScript Object Signing and Encryption (JOSE), Concise Binary Object Representation (CBOR) Object Signing and Encryption (COSE), or Object Security for Constrained RESTful Environments (OSCORE) encryption technique.

4. The server device of claim 1, wherein the intermediary device is trusted by the server device, and wherein the proof of possession token identifies the server device as an intended audience, wherein in response to identifying the server device as the intended audience, the intermediary device is caused to forward the proof of possession token to the server device.

5. The server device of claim 1, wherein the proof of possession token generated by the authentication service is wrapped by a second proof of possession token generated by the client device for verification with the intermediary device, and wherein the server device is further to verify validity of the second proof of possession token to determine that the intermediary device is an authorized proxy of the client device.

6. The server device of claim 1, wherein the proof of possession token identifies the server device and the client device.

7. The server device of claim 6, wherein the proof of possession token is one of an OAuth2, OpenID-Connect, SAML, XACML, Kerberos, or Fluffy token.

8. The server device of claim 1, wherein the client device communicates with the intermediary device using a different network protocol than a network protocol used to communicate between the server device and the intermediary device.

9. The server device of claim 1, wherein to access the access control list, the processing circuitry is to search the access control list for the client device.

10. The server device of claim 1, wherein the communication circuitry is to use Representational State Transfer (RESTful) interactions among one or more Internet of Things (IoT) network topologies to perform network communication operations, and wherein the network communication operations are conducted according to one or more Open Connectivity Foundation (OCF) specifications.

11. A method, comprising a plurality of operations executed with a processor and memory of a server device, the plurality of operations comprising:
receiving, at communication circuitry a proof of possession token forwarded from a client device by an intermediary device, the proof of possession token generated by an authentication service on behalf of the client device;
accessing, using the processor of the server device, a credential resource for the intermediary device;
verifying, using the processor of the server device, that the client device has indicated that the intermediary device is authorized to act as a valid intermediary for the client device using the credential resource;
accessing an access control list, the access control list including a client access control entry for a resource designated accessible to the client device, based on information in the proof of possession token; and
granting, to the client device, access to the resource based on a request for the resource from the client device.

12. The method of claim 11, wherein the proof of possession token is end to end encrypted from the client device to the server device, preventing the intermediary device from accessing data of the proof of possession token.

13. The method of claim 11, wherein the intermediary device is trusted by the server device, and wherein the proof of possession token identifies the server device as an intended audience, wherein in response to identifying the server device as the intended audience, forwarding, from the intermediary device, the proof of possession token to the server device.

14. The method of claim 11, wherein the proof of possession token generated by the authentication service is wrapped by a second proof of possession token generated by the client device for verification with the intermediary device, and further comprising verifying validity of the second proof of possession token to determine that the intermediary device is an authorized proxy of the client device.

15. The method of claim 11, wherein verifying the proof of possession token includes verifying that the proof of possession token was signed by the client device using an authentication key.

16. The method of claim 11, further comprising:
performing an operation to receive a message from the client device via the intermediary device with the proof of possession token, the message identifying the resource; and
determining that the access control list identifies the resource as being available to the client device in response to processing the message.

17. The method of claim 11, wherein the communication circuitry is to use Representational State Transfer (RESTful) interactions among one or more Internet of Things (IoT) network topologies to perform network communication operations, and wherein the network communication operations are conducted according to one or more Open Connectivity Foundation (OCF) specifications.

18. A non-transitory device-readable storage medium including instructions, wherein the instructions, when executed by a processing circuitry of a server device, cause the processing circuitry to:
receive, at communication circuitry a proof of possession token forwarded from a client device by an intermediary device the proof of possession token generated by an authentication service on behalf of the client device;
access, at the server device, a credential resource for the intermediary device;
verify, at the server device, that the client device has indicated that the intermediary device is authorized to act as a valid intermediary for the client device using the credential resource;
access an access control list, the access control list including a client access control entry for a resource designated accessible to the client device, based on information in the proof of possession token; and
grant, to the client device, access to the resource based on a request for the resource from the client device.

19. The device-readable storage medium of claim 18, wherein the proof of possession token is end to end encrypted from the client device to the server device, preventing the intermediary device from accessing data of the proof of possession token.

20. The device-readable storage medium of claim 18, wherein the intermediary device is trusted by the server device, and wherein the proof of possession token identifies the server device as an intended audience, wherein in response to identifying the server device as the intended audience, forwarding, from the intermediary device, the proof of possession token to the server device.

21. A system, comprising:
a server device including:
processing circuitry; and
communication circuitry to receive a proof of possession token forwarded from a client device by an intermediary device, the proof of possession token generated by an authentication service on behalf of the client device;
a memory device including instructions embodied thereon, wherein the instructions, when executed by the processing circuitry, configure the processing circuitry to perform operations to:
access, at the server device, a credential resource for the intermediary device;

verify, at the server device, that the client device has indicated that the intermediary device is authorized to act as a valid intermediary for the client device using the credential resource;

access an access control list, the access control list including a client access control entry for a resource designated accessible to the client device, based on information in the proof of possession token; and grant, to the client device, access to the resource based on a request for the resource from the client device.

22. The system of claim 21, wherein the system further comprises the intermediary device to:

receive the proof of possession token from the client device;

identify the server device as an intended audience from information in the proof of possession token;

identify, in an audience access control entry, an identifier of the server device; and forward the proof of possession token to the server device using the identifier.

23. The system of claim 22, wherein the intermediary device is a cloud device or proxy device registered to interact with the server device using Representational State Transfer (RESTful) interactions among one or more Internet of Things (IoT) network topologies, and wherein the interactions are conducted according to one or more Open Connectivity Foundation (OCF) specifications.

24. The system of claim 21, wherein the system further comprises the client device to:

generate the proof of possession token and a message requesting the resource;

send the proof of possession token and the message to the intermediary device; and receive, from the server device via the intermediary device, the information from the resource.

25. The system of claim 24, wherein the client device is further to access a web authorization provider to sign the proof of possession token, the proof of possession token signed by the client device using a key received from a credential management service.

* * * * *